United States Patent
Gleeson et al.

(10) Patent No.: US 7,831,667 B2
(45) Date of Patent: Nov. 9, 2010

(54) METHOD AND APPARATUS FOR FILTERING EMAIL SPAM USING EMAIL NOISE REDUCTION

(75) Inventors: Matt Gleeson, San Francisco, CA (US); David Hoogstrate, San Francisco, CA (US); Sandy Jensen, Berkely, CA (US); Eli Mantel, Palo Alto, CA (US); Art Medlar, Berkeley, CA (US); Ken Schneider, San Francisco, CA (US)

(73) Assignee: Symantec Corporation, Mountain View, CA (US)

( * ) Notice: Subject to any disclaimer, the term of this patent is extended or adjusted under 35 U.S.C. 154(b) by 1017 days.

(21) Appl. No.: 10/845,819

(22) Filed: May 13, 2004
(Under 37 CFR 1.47)

(65) Prior Publication Data

US 2005/0108339 A1    May 19, 2005

Related U.S. Application Data

(60) Provisional application No. 60/471,242, filed on May 15, 2003.

(51) Int. Cl.
*G06F 15/16* (2006.01)
(52) U.S. Cl. .................. 709/206; 709/207; 709/208; 709/209; 709/210; 709/211
(58) Field of Classification Search .............. 709/204, 709/205, 206
See application file for complete search history.

(56) References Cited

U.S. PATENT DOCUMENTS

| | | | |
|---|---|---|---|
| 5,377,354 A | 12/1994 | Scannell et al. | |
| 5,438,433 A | 8/1995 | Reifman et al. | |
| 5,619,648 A | 4/1997 | Canale et al. | |
| 5,634,005 A | 5/1997 | Matsuo | |
| 5,675,507 A | 10/1997 | Bobo, II | |
| 5,678,041 A | 10/1997 | Baker et al. | |
| 5,696,898 A | 12/1997 | Baker et al. | |
| 5,790,789 A | 8/1998 | Suarez | |
| 5,796,948 A | 8/1998 | Cohen | |

(Continued)

FOREIGN PATENT DOCUMENTS

EP    375138    6/1990

(Continued)

OTHER PUBLICATIONS

PCT Search Report, Int'l Application No. PCT/ US2004/ 015383, mailed Sep. 8, 2004, (7 pages).

(Continued)

*Primary Examiner*—Jeffrey Pwu
*Assistant Examiner*—Abdelnabi O Musa
(74) *Attorney, Agent, or Firm*—Meyertons, Hood, Kivlin, Kowert & Goetzel, P.C.; Dean M. Munyon

(57) ABSTRACT

A method and system for filtering email spam using email noise reduction are described. In one embodiment, the method includes detecting, in an email message, data indicative of noise added to the email message to avoid spam filtering. The method further includes modifying the content of the email message to reduce the noise, and comparing the modified content of the email message with the content of a spam message.

22 Claims, 11 Drawing Sheets

U.S. PATENT DOCUMENTS

| | | | |
|---|---|---|---|
| 5,809,242 A | 9/1998 | Shaw et al. | |
| 5,822,527 A | 10/1998 | Post | |
| 5,826,022 A | 10/1998 | Nielsen | |
| 5,835,087 A | 11/1998 | Herz et al. | |
| 5,845,263 A | 12/1998 | Camaisa et al. | |
| 5,862,325 A | 1/1999 | Reed et al. | |
| 5,864,684 A | 1/1999 | Nielsen | |
| 5,870,548 A | 2/1999 | Nielsen | |
| 5,874,955 A | 2/1999 | Rogowitz et al. | |
| 5,884,033 A | 3/1999 | Duvall et al. | |
| 5,889,943 A | 3/1999 | Ji et al. | |
| 5,905,863 A | 5/1999 | Knowles et al. | |
| 5,930,479 A | 7/1999 | Hall | |
| 5,968,117 A | 10/1999 | Schuetze | |
| 5,978,837 A | 11/1999 | Foladare et al. | |
| 5,999,932 A | 12/1999 | Paul | |
| 5,999,967 A | 12/1999 | Sundsted | |
| 6,023,700 A | 2/2000 | Owens et al. | |
| 6,023,723 A | 2/2000 | McCormick et al. | |
| 6,052,709 A | 4/2000 | Paul | |
| 6,073,165 A | 6/2000 | Narasimhan et al. | |
| 6,112,227 A | 8/2000 | Heiner | |
| 6,146,026 A | 11/2000 | Ushiku | |
| 6,157,630 A | 12/2000 | Adler et al. | |
| 6,161,130 A | 12/2000 | Horvitz et al. | |
| 6,182,118 B1 | 1/2001 | Finney et al. | |
| 6,189,026 B1 | 2/2001 | Birrell et al. | |
| 6,192,360 B1 | 2/2001 | Dumais et al. | |
| 6,195,686 B1 | 2/2001 | Moon et al. | |
| 6,199,102 B1 | 3/2001 | Cobb | |
| 6,199,103 B1 | 3/2001 | Sakaguchi et al. | |
| 6,216,165 B1 | 4/2001 | Woltz et al. | |
| 6,226,630 B1 | 5/2001 | Billmers | |
| 6,230,156 B1 | 5/2001 | Hussey | |
| 6,314,454 B1 | 11/2001 | Wang et al. | |
| 6,327,610 B2 | 12/2001 | Uchida et al. | |
| 6,334,140 B1 | 12/2001 | Kawamata | |
| 6,421,709 B1 | 7/2002 | McCormick et al. | |
| 6,505,237 B2 | 1/2003 | Beyda et al. | |
| 6,654,787 B1 | 11/2003 | Aronson et al. | |
| 6,732,157 B1* | 5/2004 | Gordon et al. | 709/206 |
| 6,931,433 B1* | 8/2005 | Ralston et al. | 709/206 |
| 6,965,919 B1* | 11/2005 | Woods et al. | 709/206 |
| 2002/0007301 A1 | 1/2002 | Reuning | |
| 2002/0199095 A1* | 12/2002 | Bandini et al. | 713/151 |
| 2003/0195937 A1 | 10/2003 | Kircher, Jr. et al. | |
| 2004/0073617 A1* | 4/2004 | Milliken et al. | 709/206 |
| 2004/0167968 A1* | 8/2004 | Wilson et al. | 709/207 |
| 2004/0210640 A1* | 10/2004 | Chadwick et al. | 709/207 |
| 2005/0108340 A1 | 5/2005 | Gleeson et al. | |
| 2006/0168006 A1* | 7/2006 | Shannon et al. | 709/206 |
| 2006/0288076 A1 | 12/2006 | Cowings et al. | |
| 2007/0106742 A1* | 5/2007 | Bellegarda et al. | 709/206 |

FOREIGN PATENT DOCUMENTS

| | | |
|---|---|---|
| EP | 0420779 | 4/1991 |
| EP | 0720333 | 7/1996 |
| GB | 2271002 | 3/1994 |
| JP | 10240649 | 9/1998 |
| JP | 0240649 | 9/2000 |
| WO | 9635994 | 11/1996 |
| WO | 9837680 | 8/1998 |
| WO | WO 01/46872 A1 | 6/2001 |

OTHER PUBLICATIONS

Damashek, Marc, "Gauging Similarity with n-Grams: Language-Independent Categorization of Text", Science, vol. 267, Feb. 10, 1995, pp. 843-848.

U.S. Appl. No. 10/117,065, entitled "Apparatus and Method for Weighted and Aging Spam Filtering Rules", by Paul, et al., filed Apr. 4, 2002.

U.S. Appl. No. 10/871,583, entitled "System and Method for Filtering Spam Message Utilizing URL Filtering Module", by Cowings, et al., filed Jun. 17, 2004.

U.S. Appl. No. 10/949,465, entitled "System and Method for Filtering Fraudulent Email Messages", by Bengzon, filed Sep. 24, 2004.

U.S. Appl. No. 11/116,572, entitled "Method and Apparatus for Creating Anti-Spam Rules", by Chin, et al., filed Apr. 27, 2005.

U.S. Appl. No. 11/127,814, entitled "Method and Apparatus for Detecting Spam in Email Messages and Email Attachments", by Cowings, et al., filed May 11, 2005.

U.S. Appl. No. 11/157,327, entitled "Method and apparatus for grouping spam email messages", by Jensen, et al., filed Jun. 20, 2005.

U.S. Appl. No. 11/048,958, entitled "Method and apparatus for determining the source of an email message", by Mantel, filed Feb. 1, 2005.

Clark, et al.; "PCMAIL: A Distributed Mail System for Personal Computers"; May 1986; MIT Laboratory for Computer Science; 24 pages.

Harker, R.; "Selectively rejecting spam using sendmail"; Proceedings of the 11th Systems Administration Conference, San Diego, CA, Oct. 1997, 17 pages.

Gaskin, J.E., "Don't get spammed", Information Week, Aug. 18, 1997, retrieved from Internet: http://www.informationweek.com/644/44olspm.htm, 9 pages.

Ranum, et al.; "Implementing a generalized tool for network monitoring"; Proceedings of the 11th Systems Administration Conference; San Diego, CA; Oct. 26-31, 1997; pp. 1-8.

Office Action of Jan. 4, 2008, in U.S. Appl. No. 10/846,723, 13 pages.

Office Action of Jul. 14, 2008, in U.S. Appl. No. 10/846,723, 43 pages.

U.S. Appl. No. 10/845,648, filed May 13, 2004.

U.S. Appl. No. 10/846,723, filed May 13, 2004.

U.S. Appl. No. 11/270,246, filed Nov. 8, 2005.

Office Action of Oct. 16, 2007, in U.S. Appl. No. 10/845,648, 17 pages.

Office Action of Jan. 4, 2008, in U.S. Appl. No. 10/846,723, 14 pages.

* cited by examiner

US 7,831,667 B2

METHOD AND APPARATUS FOR FILTERING EMAIL SPAM USING EMAIL NOISE REDUCTION

RELATED APPLICATIONS

The present application claims priority to U.S. Provisional Application Ser. No. 60/471,242, filed May 15, 2003, which is incorporated herein in its entirety.

FIELD OF THE INVENTION

The present invention relates to filtering electronic mail (email); more particularly, the present invention relates to filtering email spam using email noise reduction.

BACKGROUND OF THE INVENTION

The Internet is growing in popularity, and more and more people are conducting business over the Internet, advertising their products and services by generating and sending electronic mass mailings. These electronic messages (emails) are usually unsolicited and regarded as nuisances by the recipients because they occupy much of the storage space needed for the necessary and important data processing. For example, a mail server may have to reject accepting an important and/or desired email when its storage capacity is filled to the maximum with the unwanted emails containing advertisements. Moreover, thin client systems such as set top boxes, PDA's, network computers, and pagers all have limited storage capacity. Unwanted emails in any one of such systems can tie up a finite resource for the user. In addition, a typical user wastes time by downloading voluminous but useless advertisement information. These unwanted emails are commonly referred to as spam.

Presently, there are products that are capable of filtering out unwanted messages. For example, a spam block method exists which keeps an index list of all spam agents (i.e., companies that generate mass unsolicited e-mails), and provides means to block any e-mail sent from a company on the list.

Another "junk mail" filter currently available employs filters which are based on predefined words and patterns as mentioned above. An incoming mail is designated as an unwanted mail, if the subject contains a known spam pattern.

However, as spam filtering grows in sophistication, so do the techniques of spammers in avoiding the filters. Examples of tactics incorporated by recent generation of spammers include randomization, origin concealment, and filter evasion using HTML.

SUMMARY OF THE INVENTION

A method and system for filtering email spam using email noise reduction are described. According to one aspect, the method includes detecting, in an email message, data indicative of noise added to the email message to avoid spam filtering. The method further includes modifying the content of the email message to reduce the noise, and comparing the modified content of the email message with the content of a spam message.

Other features of the present invention will be apparent from the accompanying drawings and from the detailed description that follows.

BRIEF DESCRIPTION OF THE DRAWINGS

The present invention will be understood more fully from the detailed description given below and from the accompanying drawings of various embodiments of the invention, which, however, should not be taken to limit the invention to the specific embodiments, but are for explanation and understanding only.

FIG. 8 is a flow diagram of one embodiment of a process for determining whether two documents are similar.

DETAILED DESCRIPTION OF THE PRESENT INVENTION

Figure 1:
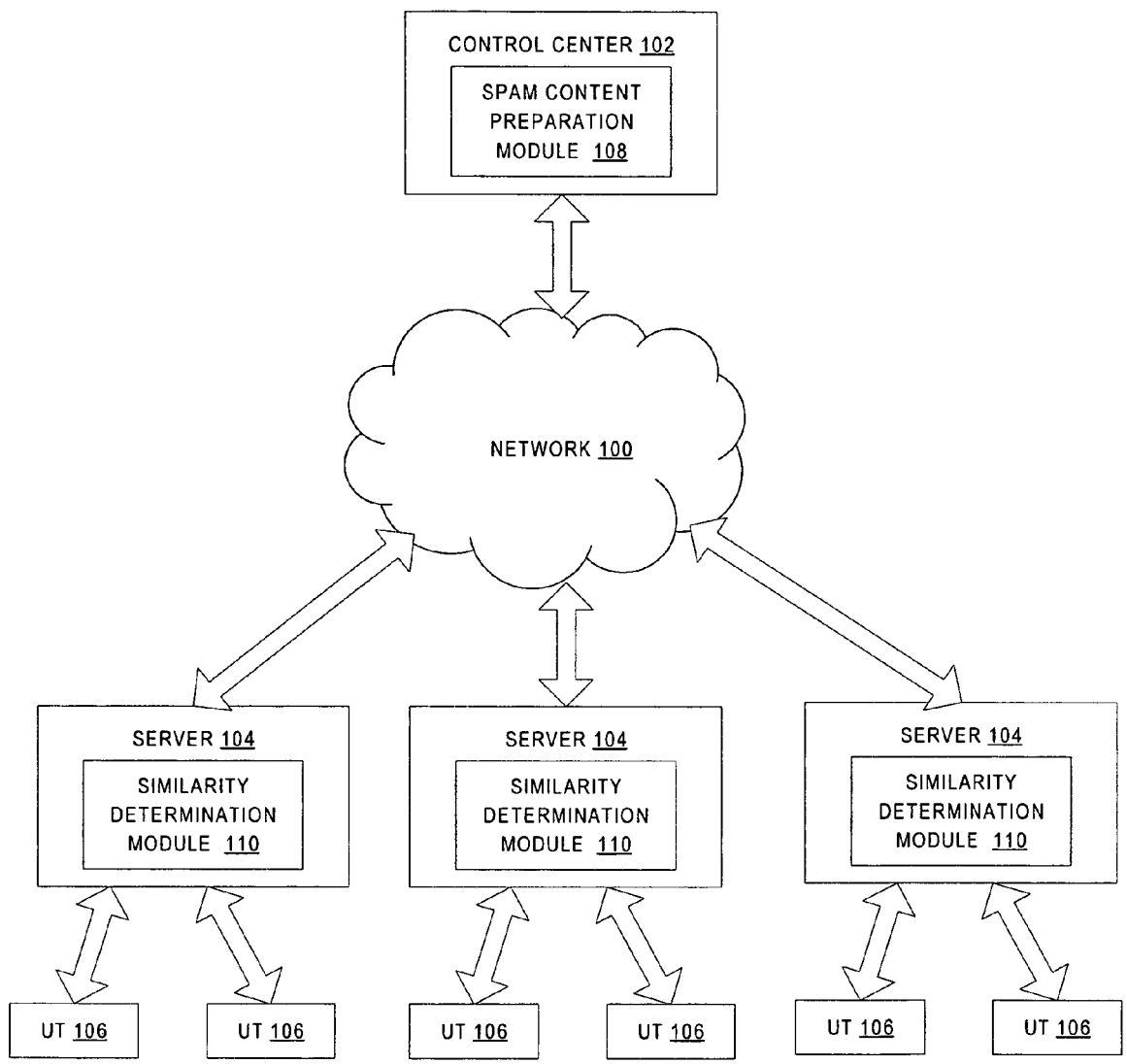
FIG. 1 is a block diagram of one embodiment of a system for controlling delivery of spam electronic mail.

A method and apparatus for filtering email spam using email noise reduction are described. In the following description, numerous details are set forth. It will be apparent, however, to one skilled in the art, that the present invention may be practiced without these specific details. In other instances, well-known structures and devices are shown in block diagram form, rather than in detail, in order to avoid obscuring the present invention.

Some portions of the detailed descriptions which follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention also relates to apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, and each coupled to a computer system bus.

The algorithms and displays presented herein are not inherently related to any particular computer or other apparatus. Various general purpose systems may be used with programs in accordance with the teachings herein, or it may prove convenient to construct more specialized apparatus to perform the required method steps. The required structure for a variety of these systems will appear from the description below. In addition, the present invention is not described with reference to any particular programming language. It will be appreciated that a variety of programming languages may be used to implement the teachings of the invention as described herein.

A machine-readable medium includes any mechanism for storing or transmitting information in a form readable by a machine (e.g., a computer). For example, a machine-readable medium includes read only memory ("ROM"); random access memory ("RAM"); magnetic disk storage media; optical storage media; flash memory devices; electrical, optical, acoustical or other form of propagated signals (e.g., carrier waves, infrared signals, digital signals, etc.); etc.

Filtering Email Spam Based on Similarity Measures

FIG. 1 is a block diagram of one embodiment of a system for controlling delivery of spam electronic mail (email). The system includes a control center 102 coupled to a communications network 100 such as a public network (e.g., the Internet, a wireless network, etc.) or a private network (e.g., LAN, Intranet, etc.). The control center 102 communicates with multiple network servers 104 via the network 100. Each server 104 communicates with user terminals 106 using a private or public network.

The control center 102 is an anti-spam facility that is responsible for analyzing messages identified as spam, developing filtering rules for detecting spam, and distributing the filtering rules to the servers 104. A message may be identified as spam because it was sent by a known spam source (as determined, for example, using a "spam probe", i.e., an email address specifically selected to make its way into as many spammer mailing lists as possible).

A server 104 may be a mail server that receives and stores messages addressed to users of corresponding user terminals sent. Alternatively, a server 104 may be a different server coupled to the mail server 104. Servers 104 are responsible for filtering incoming messages based on the filtering rules received from the control center 102.

In one embodiment, the control center 102 includes a spam content preparation module 108 that is responsible for generating data characterizing the content associated with a spam attack and sending this data to the servers 104. Each server 104 includes a similarity determination module 110 that is responsible for storing spam data received from the control center 102 and identifying incoming email messages resembling the spam content using the stored data.

In an alternative embodiment, each server 104 hosts both the spam content preparation module 108 that generates data characterizing the content associated with a spam attack and the similarity determination module 110 that uses the generated data to identify email messages resembling the spam content.

Figure 2:
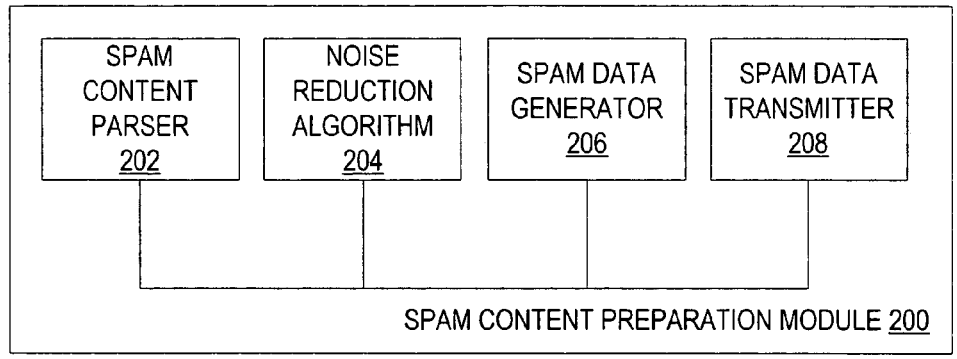
FIG. 2 is a block diagram of one embodiment of a spam content preparation module.

FIG. 2 is a block diagram of one embodiment of a spam content preparation module 200. The spam content preparation module 200 includes a spam content parser 202, a spam data generator 206, and a spam data transmitter 208.

The spam content parser 202 is responsible for parsing the body of email messages resulting from spam attacks (referred to as spam messages).

The spam data generator 206 is responsible for generating data characterizing a spam message. In one embodiment, data characterizing a spam message includes a list of hash values calculated for sets of tokens (e.g., characters, words, lines, etc.) composing the spam message. Data characterizing a spam message or any other email message is referred to herein as a message signature. Signatures of spam messages or any other email messages may contain various data identifying the message content and may be created using various algorithms that enable the use of similarity measures in comparing signatures of different email messages.

In one embodiment, the spam content preparation module 200 also includes a noise reduction algorithm 204 that is responsible for detecting data indicative of noise and removing the noise from spam messages prior to generating signatures of spam messages. Noise represents data invisible to a recipient that was added to a spam message to hide its spam nature.

In one embodiment, the spam content preparation module 200 also includes a message grouping algorithm (not shown) that is responsible for grouping messages originated from a single spam attack. Grouping may be performed based on specified characteristics of spam messages (e.g., included URLs, message parts, etc.). If grouping is used, the spam data generator 206 may generate a signature for a group of spam messages rather than for each individual message.

The spam data transmitter 208 is responsible for distributing signatures of spam messages to participating servers such as servers 104 of FIG. 1. In one embodiment, each server 104 periodically (e.g., each 5 minutes) initiates a connection (e.g., a secure HTTPS connection) with the call center 102. Using this pull-based connection, signatures are transmitted from the call center 102 to the relevant server 106.

Figure 3:
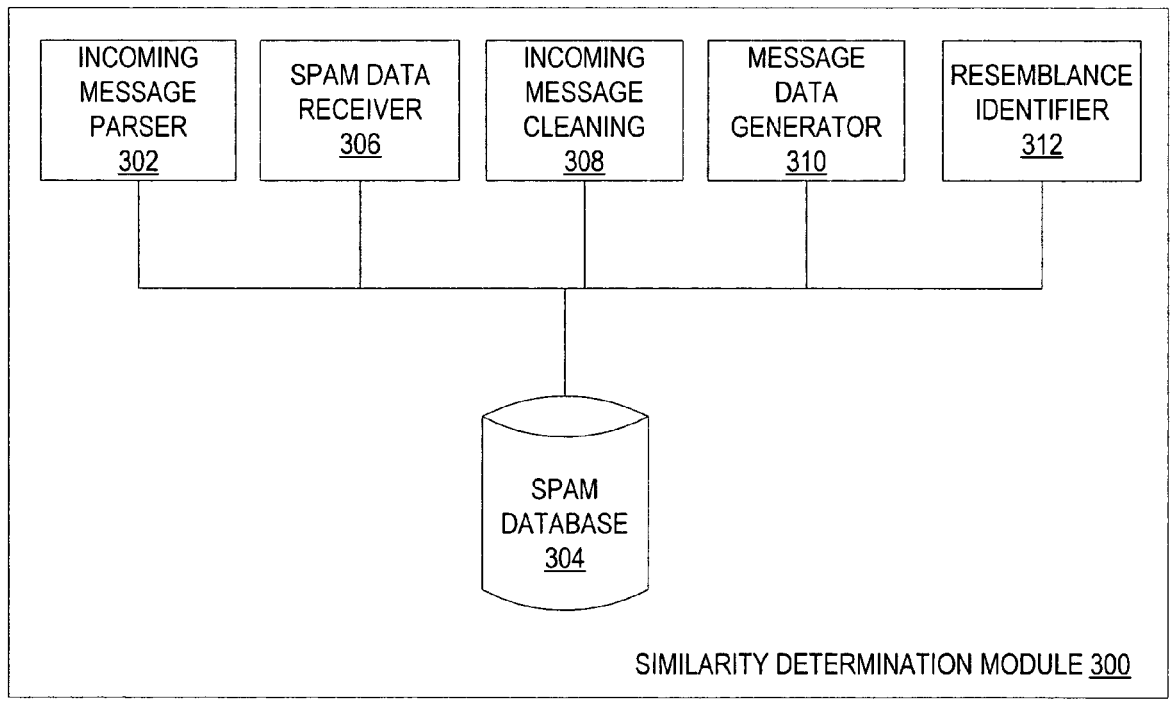
FIG. 3 is a block diagram of one embodiment of a similarity determination module.

FIG. 3 is a block diagram of one embodiment of a similarity determination module 300. The similarity determination module 300 includes an incoming message parser 302, a spam data receiver 306, a message data generator 310, a resemblance identifier 312, and a spam database 304.

The incoming message parser 302 is responsible for parsing the body of incoming email messages.

The spam data receiver 306 is responsible for receiving signatures of spam messages and storing them in the spam database 304.

The message data generator 310 is responsible for generating signatures of incoming email messages. In some embodiments, a signature of an incoming email message includes a list of hash values calculated for sets of tokens (e.g., characters, words, lines, etc.) composing the incoming email message. In other embodiments, a signature of an incoming email message includes various other data characterizing the content of the email message (e.g., a subset of token sets composing the incoming email message). As discussed above, signatures of email messages may be created using various algorithms that allow for use of similarity measures in comparing signatures of different email messages.

In one embodiment, the similarity determination module 300 also includes an incoming message cleaning algorithm 308 that is responsible for detecting data indicative of noise and removing the noise from the incoming email messages prior to generating their signatures, as will be discussed in more detail below.

The resemblance identifier 312 is responsible for comparing the signature of each incoming email message with the signatures of spam messages stored in the spam database 304 and determining, based on this comparison, whether an incoming email message is similar to any spam message.

In one embodiment, the spam database 304 stores signatures generated for spam messages before they undergo the noise reduction process (i.e., noisy spam messages) and signatures generated for these spam messages after they undergo the noise reduction process (i.e., spam message with reduced noise). In this embodiment, the message data generator 310 first generates a signature of an incoming email message prior to noise reduction, and the resemblance identifier 312 compares this signature with the signatures of noisy spam messages. If this comparison indicates that the incoming email message is similar to one of these spam messages, then the resemblance identifier 312 marks this incoming email message as spam. Alternatively, the resemblance identifier 312 invokes the incoming message cleaning algorithm 308 to remove noise from the incoming email message. Then, the message data generator 310 generates a signature for the modified incoming message, which is then compared by the resemblance identifier 312 with the signatures of spam messages with reduced noise.

Figure 4:
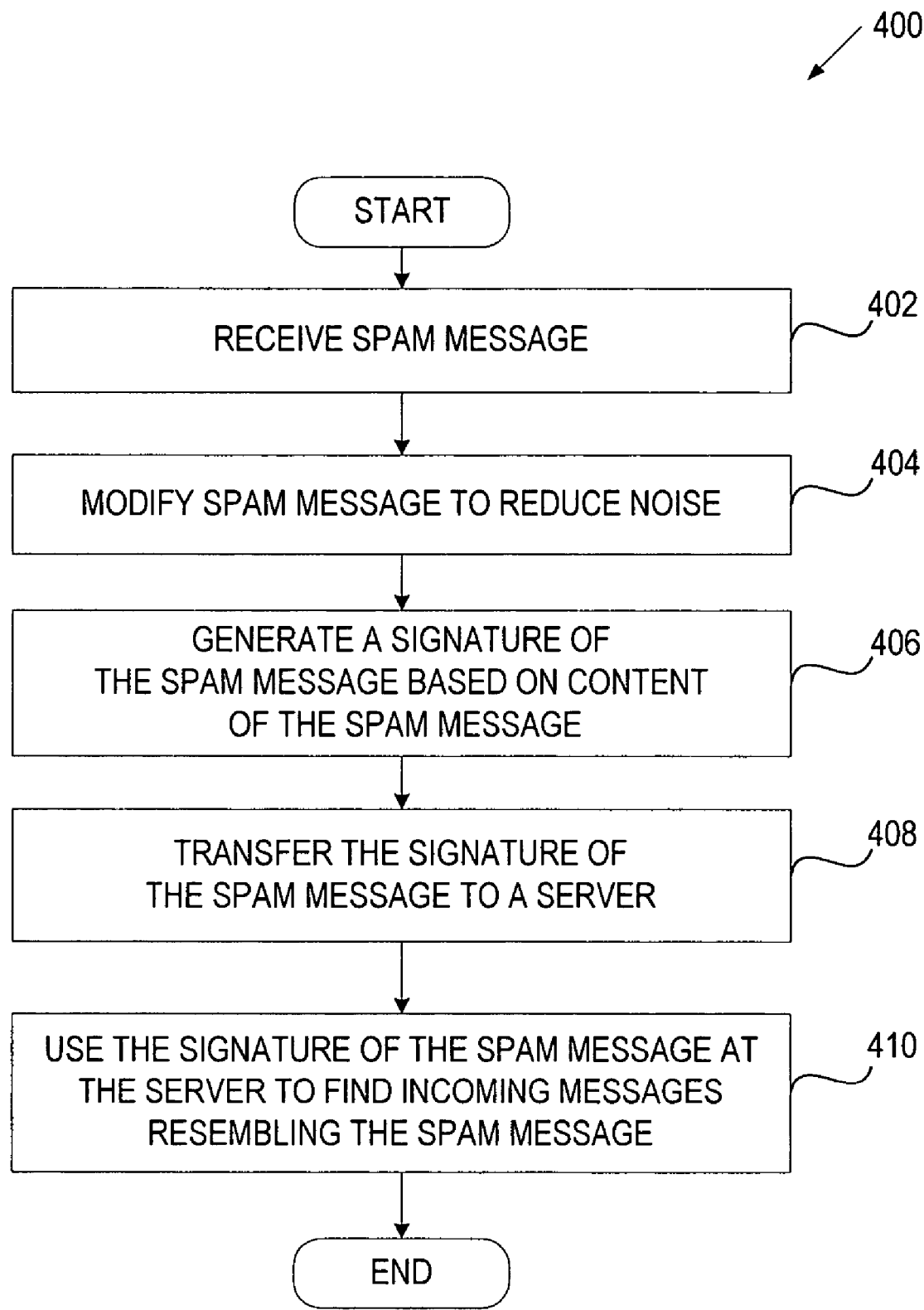
FIG. 4 is a flow diagram of one embodiment of a process for handling a spam message.

FIG. 4 is a flow diagram of one embodiment of a process 400 for handling a spam message. The process may be performed by processing logic that may comprise hardware (e.g., dedicated logic, programmable logic, microcode, etc.), software (such as run on a general purpose computer system or a dedicated machine), or a combination of both. In one embodiment, processing logic resides at a control center 102 of FIG. 1.

Referring to FIG. 4, process 400 begins with processing logic receiving a spam message (processing block 402).

At processing block 404, processing logic modifies the spam message to reduce noise. One embodiment of a noise reduction algorithm will be discussed in more detail below in conjunction with FIGS. 9 and 10.

At processing block 406, processing logic generates a signature of the spam message. In one embodiment, a signature of the spam message includes a list of hash values calculated for sets of tokens (e.g., characters, words, lines, etc.) composing the incoming email message, as will be discussed in more detail below in conjunction with FIG. 6A. In other embodiments, a signature of an incoming email message includes various other data characterizing the content of the email message.

At processing block 408, processing logic transfers the signature of the spam message to a server (e.g., a server 104 of FIG. 1), which uses the signature of the spam message to find incoming email messages resembling the spam message (block 410).

Figure 5:
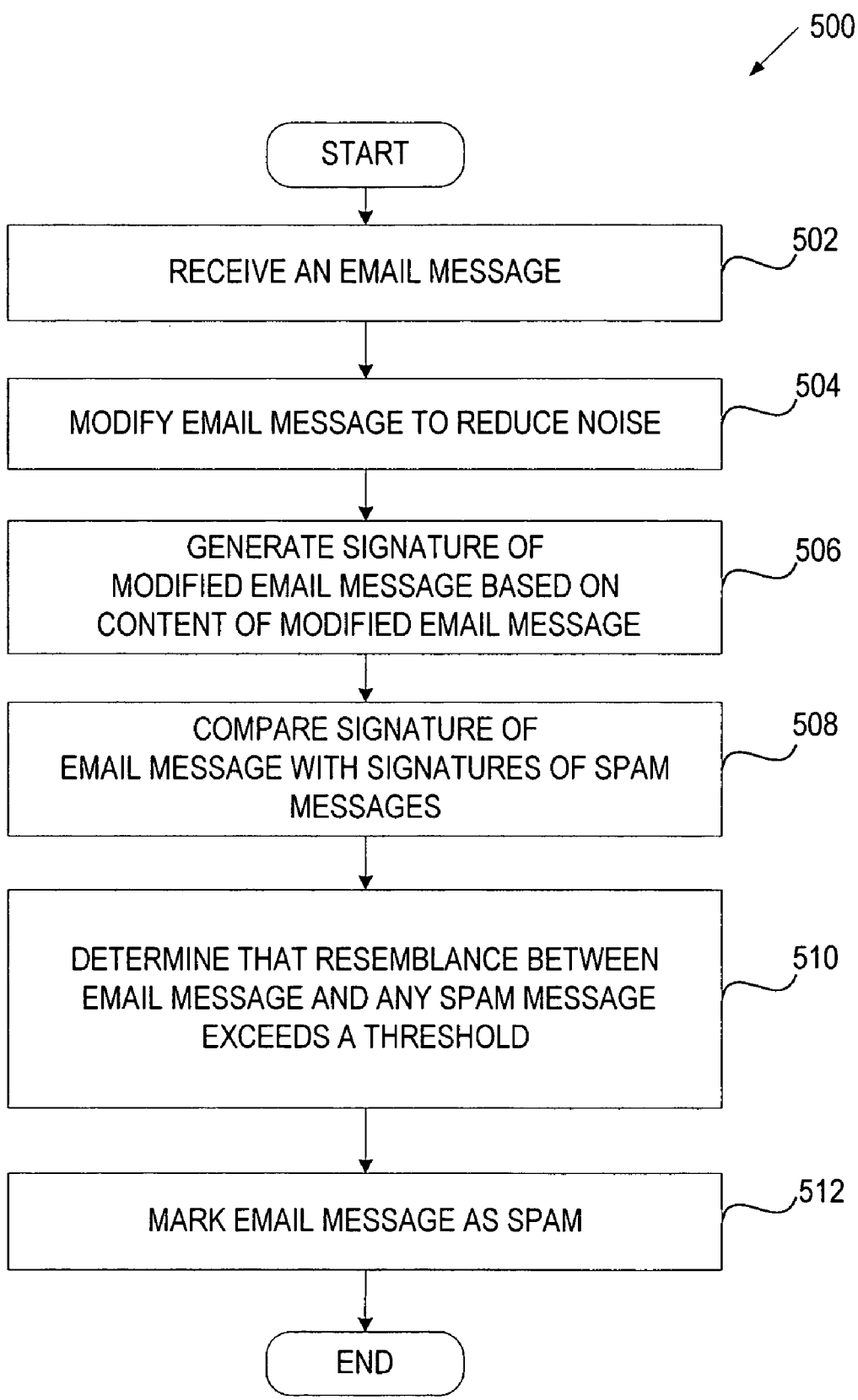
FIG. 5 is a flow diagram of one embodiment of a process for filtering email spam based on similarities measures.

FIG. 5 is a flow diagram of one embodiment of a process 500 for filtering email spam based on similarities measures. The process may be performed by processing logic that may comprise hardware (e.g., dedicated logic, programmable logic, microcode, etc.), software (such as run on a general purpose computer system or a dedicated machine), or a combination of both. In one embodiment, processing logic resides at a server 104 of FIG. 1.

Referring to FIG. 5, process 500 begins with processing logic receiving an incoming email message (processing block 502).

At processing block 504, processing logic modifies the incoming message to reduce noise. One embodiment of a noise reduction algorithm will be discussed in more detail below in conjunction with FIGS. 9 and 10.

At processing block 506, processing logic generates a signature of the incoming message based on the content of the incoming message. In one embodiment, a signature of an incoming email message includes a list of hash values calculated for sets of tokens (e.g., characters, words, lines, etc.) composing the incoming email message, as will be discussed in more detail below in conjunction with FIG. 6A. In other embodiments, a signature of an incoming email message includes various other data characterizing the content of the email message.

At processing block 508, processing compares the signature of the incoming messages with signatures of spam messages.

At processing block 510, processing logic determines that the resemblance between the signature of the incoming message and a signature of some spam message exceeds a threshold similarity measure. One embodiment of a process for determining the resemblance between two messages is discussed in more detail below in conjunction with FIG. 6B.

At processing block 512, processing logic marks the incoming email message as spam.

Figure 6A:
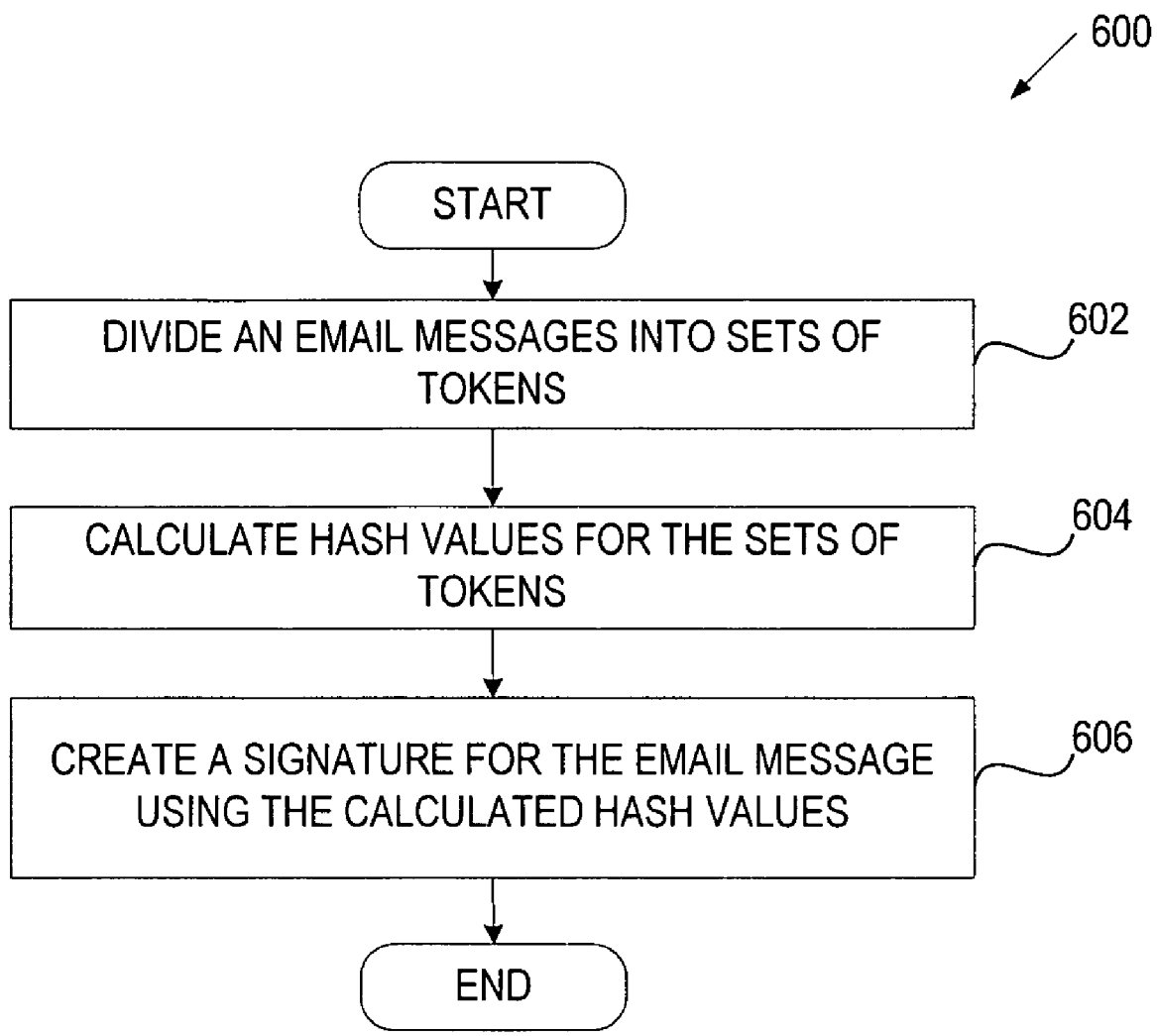
FIG. 6A is a flow diagram of one embodiment of a process for creating a signature of an email message.

FIG. 6A is a flow diagram of one embodiment of a process 600 for creating a signature of an email message. The process may be performed by processing logic that may comprise hardware (e.g., dedicated logic, programmable logic, microcode, etc.), software (such as run on a general purpose computer system or a dedicated machine), or a combination of both. In one embodiment, processing logic resides at a server 104 of FIG. 1.

Referring to FIG. 6A, process 600 begins with processing logic dividing an email message into sets of tokens (processing block 602). Each set of tokens may include a predefined number of sequential units from the email message. The predefined number may be equal to, or greater than, 1. A unit may represent a character, a word or a line in the email message. In one embodiment, each set of tokens is combined with the number of occurrences of this set of tokens in the email message.

At processing block 604, processing logic calculates hash values for the sets of tokens. In one embodiment, a hash value is calculated by applying a hash function to each combination of a set of tokens and a corresponding token occurrence number.

At processing block 606, processing logic creates a signature for the email message using the calculated hash values. In one embodiment, the signature is created by selecting a subset of calculated hash values and adding a parameter characterizing the email message to the selected subset of calculated hash values. The parameter may specify, for example, the size of the email message, the number of calculated hash values, the keyword associated with the email message, the name of an attachment file, etc.

In one embodiment, a signature for an email message is created using a character-based document comparison mechanism that will be discussed in more detail below in conjunction with FIGS. 7 and 8.

Figure 6B:
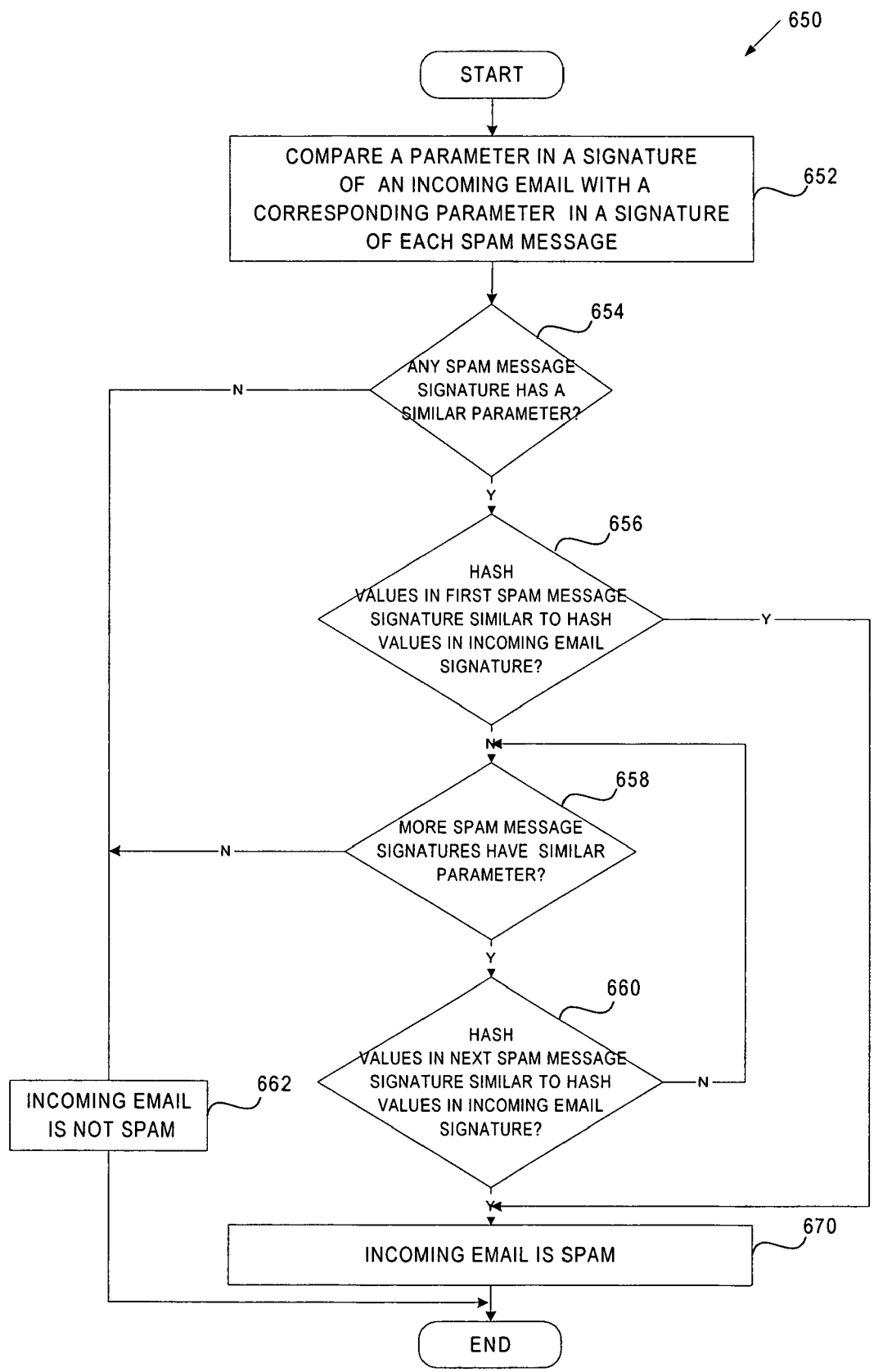
FIG. 6B is a flow diagram of one embodiment of a process for detecting spam using a signature of an email message.

FIG. 6B is a flow diagram of one embodiment of a process 650 for detecting spam using a signature of an email message. The process may be performed by processing logic that may comprise hardware (e.g., dedicated logic, programmable logic, microcode, etc.), software (such as run on a general purpose computer system or a dedicated machine), or a combination of both. In one embodiment, processing logic resides at a server 104 of FIG. 1.

Referring to FIG. 6B, process 650 compares data in a signature of an incoming email message with data in a signature of each spam message. The signature data includes a parameter characterizing the content of an email message and a subset of hash values generated for the tokens contained in the email message. The parameter may specify, for example, the size of the email message, the number of tokens in the email message, the keyword associated with the email message, the name of an attachment file, etc.

Processing logic begins with comparing a parameter in a signature of the incoming email message with a corresponding parameter in a signature of each spam message (processing block 652).

A decision box 654, processing logic determines whether any spam message signatures contain a parameter similar to the parameter of the incoming message signature. The similarity may be determined, for example, based on the allowed difference between the two parameters or the allowed ratio of the two parameters.

If none of the spam message signatures contain a parameter similar to the parameter of the incoming message signature, processing logic decides that the incoming email message is legitimate (i.e., it is not spam) (processing block 662).

Alternatively, if one or more spam message signatures have a similar parameter, processing logic determines whether the signature of he first spam message has hash values similar to the hash values in the signature of the incoming email (decision box 656). Based on the similarity threshold, the hash values may be considered similar if, for example, a certain number of them matches or the ratio of matched and unmatched hash values exceeds a specified threshold.

If the first spam message signature has hash values similar to the hash values of the incoming email signature, processing logic decides that the incoming email message is spam (processing block 670). Otherwise, processing logic further determines if there are more spam message signatures with the similar parameter (decision box 658). If so, processing logic determines whether the next spam message signature has hash values similar to the hash values of the incoming email signature (decision box 656). If so, processing logic decides that the incoming email message is spam (processing block 670). If not, processing logic returns to processing block 658.

If processing logic determines that no other spam message signatures have the similar parameter, then it decides that the incoming mail message is not spam (processing block 662).

Character-Based Document Comparison Mechanism

Figure 7:
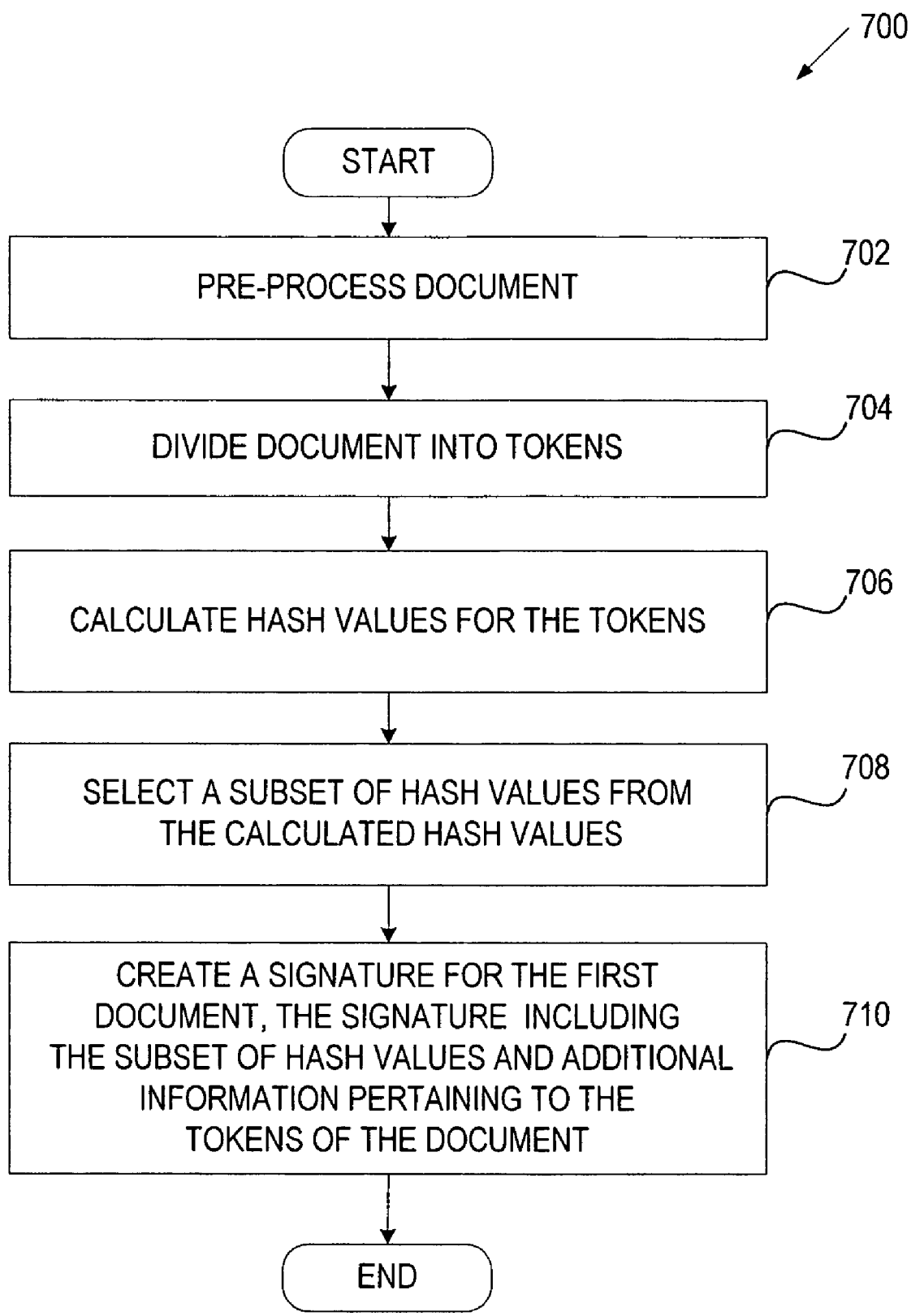
FIG. 7 is a flow diagram of one embodiment of a process for a character-based comparison of documents.

FIG. 7 is a flow diagram of one embodiment of a process 700 for a character-based comparison of documents. The process may be performed by processing logic that may comprise hardware (e.g., dedicated logic, programmable logic, microcode, etc.), software (such as run on a general purpose computer system or a dedicated machine), or a combination of both.

Referring to FIG. 7, process 700 begins with processing logic pre-processing a document (processing block 702). In one embodiment, the document is pre-processed by changing each upper case alphabetic character within the document to a lower case alphabetic character. For example, the message "I am Sam, Sam I am." may be pre-processed into an expression "i.am.sam.sam.i.am".

At processing block 704, processing logic divides the document into tokens, with each token including a predefined number of sequential characters from the document. In one embodiment, each token is combined with its occurrence number. This combination is referred to as a labeled shingle. For example, if the predefined number of sequential characters in the token is equal to 3, the expression specified above includes the following set of labeled shingles:

i.a1
.am1
am.1
m.s1
.sa1
sam1
sm.2
m.s1
.sm2
sam2
am.3
m.i1
.i.1
i.a2
.am4

In one embodiment, the shingles are represented as a histogram.

At processing block 706, processing logic calculates hash values for the tokens. In one embodiment, the hash values are calculated for the labeled shingles. For example, if a hashing function H(x) is applied to each labeled shingle illustrated above, the following results are produced:

H(i.a1)->458348732
H(.am1)->200404023
H(am.1)->692939349
H(m.s1)->220443033
H(.sa1)->554034022
H(8am1)->542929292
H(am.2)->629292229
H(m.s1)->702202232
H(.sa2)->322243349
H(8am2)->993923828
H(am.3)->163393269
H(m.i1)->595437753
H(.i.1)->843438583
H(i.a2)->244485639
H(.am4)->493869359

In one embodiment, processing logic then sorts the hash values as follows:

163393269
200604023
220643033
246685639
322263369
458368732
493869359
542929292
554034022
595637753
629292229
692939349
702202232
843438583
993923828

At processing block 708, processing logic selects a subset of hash values from the calculated hash values. In one embodiment, processing logic selects X smallest values from the sorted hash values and creates from them a "sketch" of the document. For example, for X=4, the sketch can be expressed as follows:

[163393269 200404023 220443033 244485639].

At processing block 710, processing logic creates a signature of the document by adding to the sketch a parameter pertaining to the tokens of the document. In one embodiment, the parameter specifies the number of original tokens in the document. In the example above, the number of original tokens is 15. Hence, the signature of the document can be expressed as follows:

[15 163393269 200404023 220443033 244485639].

Alternatively, the parameter may specify any other characteristic of the content of the document (e.g., the size of the document, the keyword associated with the document, etc.).

Figure 8:
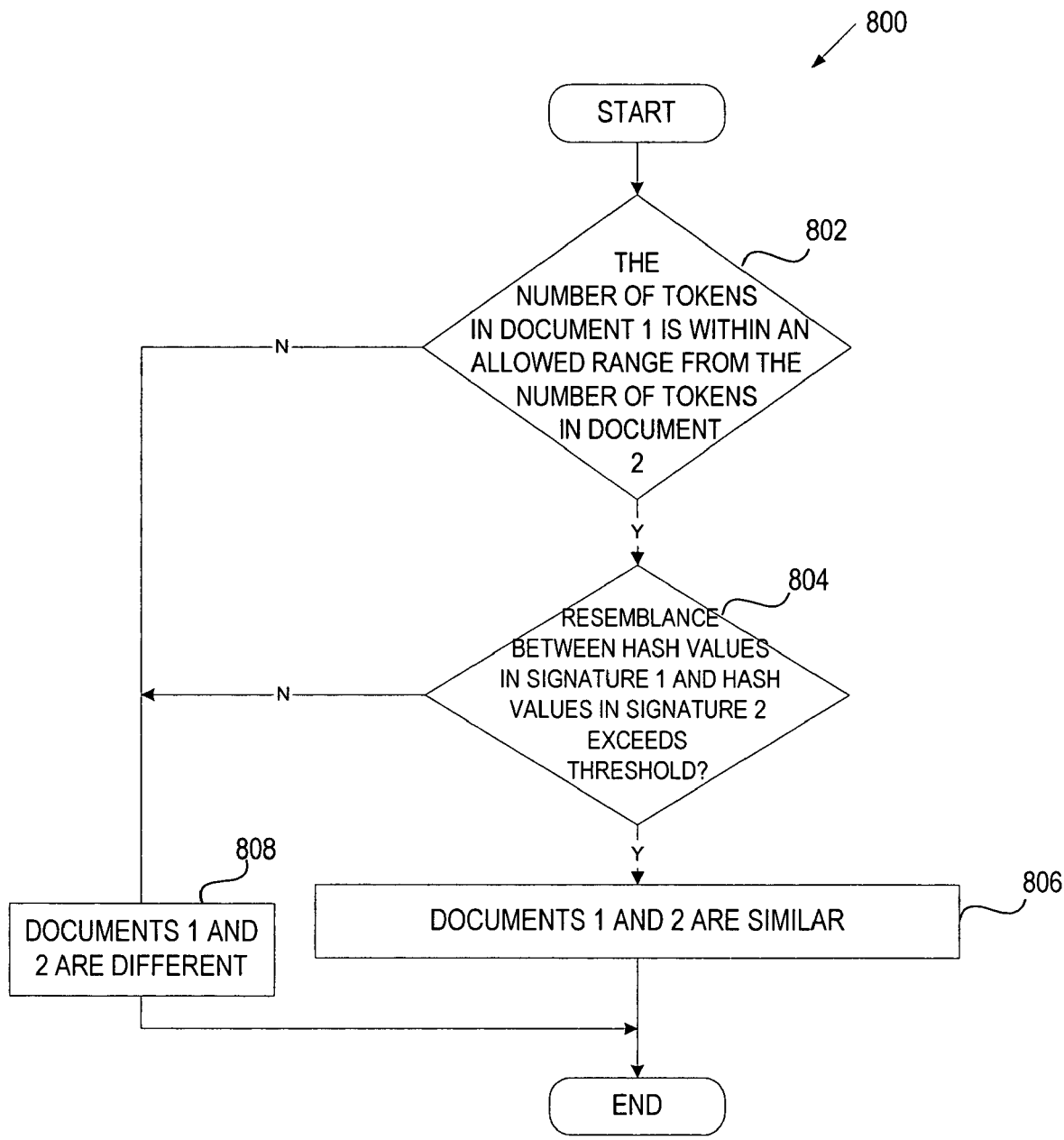

FIG. 8 is a flow diagram of one embodiment of a process 800 for determining whether two documents are similar. The process may be performed by processing logic that may comprise hardware (e.g., dedicated logic, programmable logic, microcode, etc.), software (such as run on a general purpose computer system or a dedicated machine), or a combination of both.

Referring to FIG. 8, process 800 begins with processing logic comparing the token numbers specified in the signatures of documents 1 and 2, and determining whether the token number in the first signature is within the allowed range with respect to the token number from the second signature (decision box 802). For example, the allowed range may be a difference of 1 or less or a ratio of 90 percent or higher.

If the token number in the first signature is outside of the allowed range with respect to the token number from the second signature, processing logic decides that documents 1 and 2 are different (processing block 808). Otherwise, if the token number in the first signature is within the allowed range with respect to the token number from the second signature, processing logic determines whether the resemblance between hash values in signatures 1 and 2 exceeds a threshold (e.g., more than 95 percent of hash values are the same) (decision box 804). If so, processing logic decides that the two documents are similar (processing block 806). If not, processing logic decides that documents 1 and 2 are different (processing block 808).

Email Spam Filtering Using Noise Reduction

Figure 9:
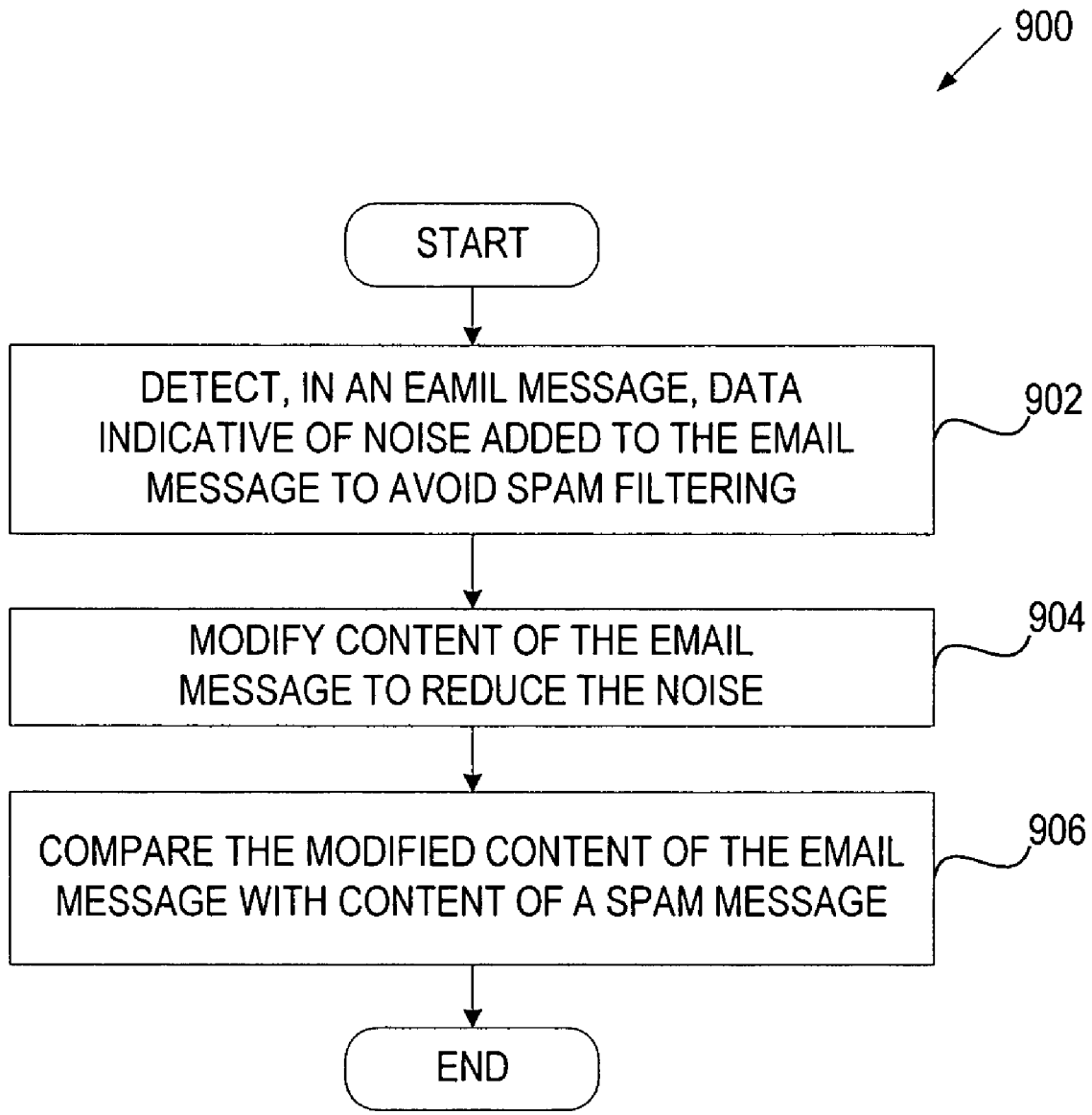
FIG. 9 is a flow diagram of one embodiment of a process for reducing noise in an email message.

FIG. 9 is a flow diagram of one embodiment of a process 900 for reducing noise in an email message. The process may be performed by processing logic that may comprise hardware (e.g., dedicated logic, programmable logic, microcode, etc.), software (such as run on a general purpose computer system or a dedicated machine), or a combination of both.

Referring to FIG. 9, process 900 begins with processing logic detecting in an email message data indicative of noise (processing block 902). As discussed above, noise represents data that is invisible to a recipient of the mail message and was added to the email message to avoid spam filtering. Such data may include, for example, formatting data (e.g., HTML tags), numeric character references, character entity references, URL data of predefined categories, etc. Numeric character references specify the code position of a character in the document character set. Character entity references use symbolic names so that authors need not remember code positions. For example, the character entity reference å refers to the lowercase "a" character topped with a ring.

At processing block 904, processing logic modifies the content of the email message to reduce the noise. In one embodiment, the content modification includes removing formatting data, translating numeric character references and charcater entity references to their ASCII equivalents, and modifying URL data.

At processing block 906, processing logic compares the modified content of the email message with the content of a spam message. In one embodiment, the comparison is performed to identify an exact match. Alternatively, the comparison is performed to determine whether the two documents are similar.

Figure 10:
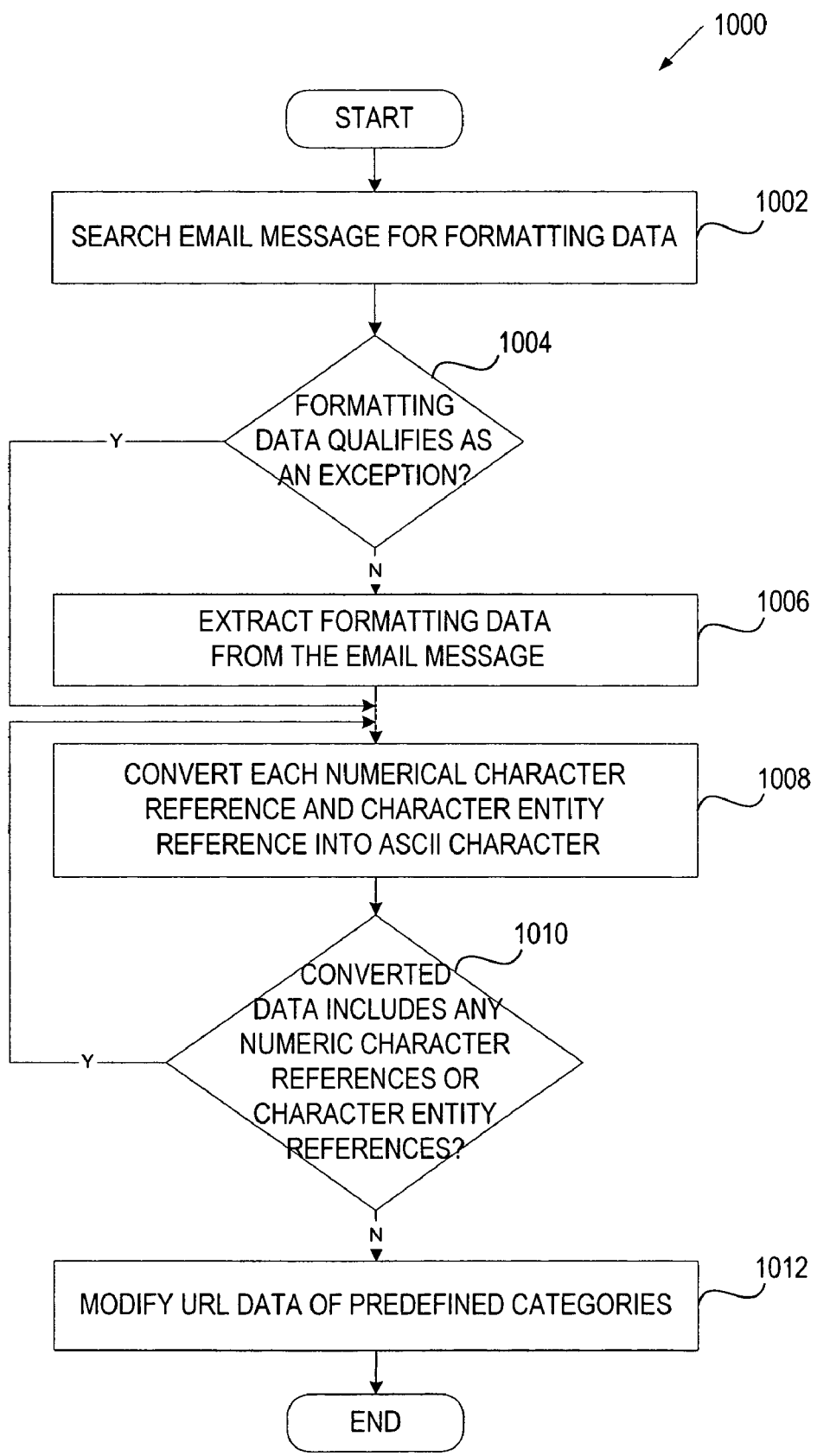
FIG. 10 is a flow diagram of one embodiment of a process for modifying an email message to reduce noise.

FIG. 10 is a flow diagram of one embodiment of a process 1000 for modifying an email message to reduce noise. The process may be performed by processing logic that may comprise hardware (e.g., dedicated logic, programmable logic, microcode, etc.), software (such as run on a general purpose computer system or a dedicated machine), or a combination of both.

Referring to FIG. 10, process 1000 begins with processing logic searching an email message for formatting data (e.g., HTML tags) (processing block 1002).

At decision box 1004, processing logic determines whether the found formatting data qualifies as an exception. Typically, HTML formatting does not add anything to the information content of a message. However, a few exceptions exist. These exceptions are the tags that contain useful information for further processing of the message (e.g., tags <BODY>, <A>, <IMG>, and <FONT>). For example, the <FONT> and <BODY> tags are needed for "white on white" text elimination, and the <A> and <IMG> tags typically contain link information that may be used for passing data to other components of the system.

If the formatting data does not qualify as an exception, the formatting data is extracted from the email message (processing block 1006).

Next, processing logic converts each numerical character reference and character entity reference into a corresponding ASCII character (processing block 1008).

In HTML, numeric character references may take two forms:
1. The syntax "&#D;", where D is a decimal number, refers to the ISO 10646 decimal character number D; and
2. The syntax "&#xH;" or "&#XH;", where H is a hexadecimal number, refers to the ISO 10646 hexadecimal character number H. Hexadecimal numbers in numeric character references are case-insensitive.

For example, randomized characters in the body may appear as a following expression:

The
 SavingsReg
is
terwants you.

This expression has a meaning of the phrase "The SavingsRegister wants you."

Some times the conversion performed at processing block 1008 may need to be repeated. For example, the string "&" corresponds to the string "&" in ASCII, the string "#" corresponds to the string "#" in ASCII, the string "3" corresponds to 3 in ASCII, the string "#56;" corresponds to 8 in ASCII, and "#59;" corresponds to the string ";" in ASCII. Hence, the combined string "&#38;", when converted, results in the string "&" that needs to be converted.

Accordingly, after the first conversion operation at processing block 1008, processing logic checks whether the converted data still includes numeric character references or character entity references (decision box 1010). If the check is positive, processing logic repeats the conversion operation at processing block 1008. Otherwise, processing logic proceeds to processing block 1012.

At processing block 1012, processing logic modifies URL data of predefined categories. These categories may include, for example, numerical character references contained in the URL that are converted by processing logic into corresponding ASCII characters. In addition, the URL "password" syntax may be used to add characters before an "i" in the URL hostname. These characters are ignored by the target web server but they add significant amounts of noise information to each URL. Processing logic modifies the URL data by removing these additional characters. Finally, processing logic removes the "query" part of the URL, following a string "?" at the end of the URL.

An example of a URL is as follows:

http%3a%2f%2flotsofjunk@www.foo.com%2fbar.html?muchmorejunk

Processing logic modifies the above URL data into http://www.foo.com/bar.html.

An Exemplary Computer System

Figure 11:
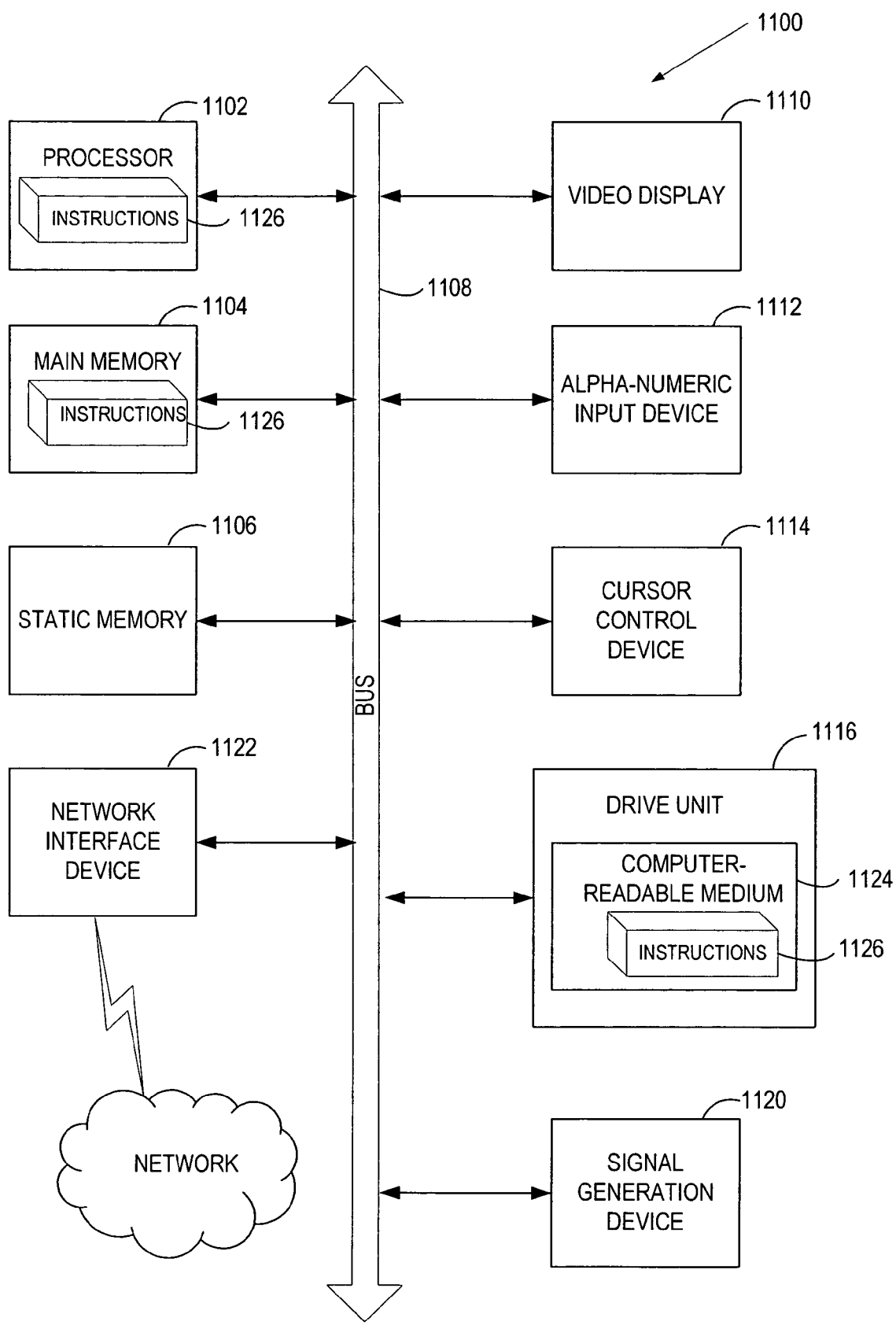
FIG. 11 is a block diagram of an exemplary computer system.

FIG. 11 is a block diagram of an exemplary computer system 1100 that may be used to perform one or more of the operations described herein. In alternative embodiments, the machine may comprise a network router, a network switch, a network bridge, Personal Digital Assistant (PDA), a cellular telephone, a web appliance or any machine capable of executing a sequence of instructions that specify actions to be taken by that machine.

The computer system 1100 includes a processor 1102, a main memory 1104 and a static memory 1106, which communicate with each other via a bus 1108. The computer system 1100 may further include a video display unit 1110 (e.g., a liquid crystal display (LCD) or a cathode ray tube (CRT)). The computer system 1100 also includes an alpha-numeric input device 1112 (e.g., a keyboard), a cursor control device 1114 (e.g., a mouse), a disk drive unit 1116, a signal generation device 1120 (e.g., a speaker) and a network interface device 1122.

The disk drive unit 1116 includes a computer-readable medium 1124 on which is stored a set of instructions (i.e., software) 1126 embodying any one, or all, of the methodologies described above. The software 1126 is also shown to reside, completely or at least partially, within the main memory 1104 and/or within the processor 1102. The software 1126 may further be transmitted or received via the network interface device 1122. For the purposes of this specification, the term "computer-readable medium" shall be taken to include any medium that is capable of storing or encoding a sequence of instructions for execution by the computer and that cause the computer to perform any one of the methodologies of the present invention. The term "computer-readable medium" shall accordingly be taken to included, but not be limited to, solid-state memories, optical and magnetic disks, and carrier wave signals.

Whereas many alterations and modifications of the present invention will no doubt become apparent to a person of ordinary skill in the art after having read the foregoing description, it is to be understood that any particular embodiment shown and described by way of illustration is in no way intended to be considered limiting. Therefore, references to details of various embodiments are not intended to limit the scope of the claims which in themselves recite only those features regarded as essential to the invention.

We claim:

1. A method, comprising:
    a computer system detecting, in an email message, one or more character references added to the email message to avoid spam filtering, wherein each character reference specifies a position of a character within a first character set;
    the computer system modifying content of the email message, including by converting at least one of the one or more character references to a character corresponding to the specified position within the first character set; and
    the computer system comparing the modified content of the email message with content of a spam message;
    wherein each of the one or more character references is an HTML character reference of the form "&#<num>", wherein <num> is a value that specifies a position of a character within the first character set.

2. The method of claim 1, wherein the first character set is an ASCII character set.

3. The method of claim 1, wherein said modifying the content of the email message comprises:
    the computer system converting a first group of character references in the email message into corresponding characters within the first character set;
    the computer system making a determination that the converted first group of character references forms a new group of character references; and
    responsive to said determination, the computer system converting the new group of character references into corresponding characters within the first character set.

4. The method of claim 3, wherein the email message includes HTML data, and wherein the converted first group of character references includes a character indicative of a reference to a character position in the first character set.

5. The method of claim 1, wherein at least one of the one or more character references is located in a URL in the email message.

6. The method of claim 1, wherein said comparing comprises:
    determining whether the modified content of the email message is similar to the content of the spam message.

7. A system, comprising:
    one or more processors;
    a memory having stored therein program instructions executable by the one or more processors to:
        detect, in an email message, one or more character references added to the email message to avoid spam filtering, wherein each character reference specifies a position of a character within a first character set;
        modify content of the email message, including by converting at least one of the one or more character references to a character corresponding to the specified position within the first character set;
        compare the modified content of the email message with content of a spam message; and
        wherein each of the one or more character references is an HTML character reference of the form "&#<num>", wherein <num> is a value that specifies a position of a character within the first character set.

8. The system of claim 7, wherein the first character set is an ASCII character set.

9. The system of claim 7, wherein the program instructions are further executable to:
    modify the content of the email message by converting a first group of character references in the email message into corresponding characters within the first character set;

make a determination that the converted first group of character references forms a new group of character references; and responsive to said determination, convert the new group of character references into corresponding characters within the first character set.

10. The system of claim 9, wherein the email message includes HTML data, and wherein the converted first group of character references includes a character indicative of a reference to a character position in the first character set.

11. The system of claim 7, wherein at least one of the one or more character references is located in a URL in the email message.

12. The system of claim 7, wherein the program instructions are executable to compare the modified content of the email message with the content of the spam message by determining whether the modified content of the email message is similar to the content of the spam message.

13. A non-transitory tangible computer-readable medium having stored thereon program instructions executable by a computer system to:
   detect, in an email message, one or more character references added to the email message to avoid spam filtering, wherein each character reference specifies a position of a character within a first character set;
   modify content of the email message, including by converting at least one of the one or more character references to a character corresponding to the specified position within the first character set;
   compare the modified content of the email message with content of a spam message; and
   wherein each of the one or more character references is an HTML character reference of the form "&#<num>", wherein <num> is a value that specifies a position of a character within the first character set.

14. The tangible computer-readable medium of claim 13, wherein the first character set is an ASCII character set.

15. The tangible computer-readable medium of claim 13, wherein the program instructions are further executable to:
   convert a first group of character references in the email message into corresponding characters within the first character set;
   make a determination that the converted first group of character references forms a new group of character references; and
   responsive to said determination, convert the new group of character references into corresponding characters within the first character set.

16. The tangible computer-readable medium of claim 15, wherein the email message includes HTML data, and wherein the converted first group of character references includes a character indicative of a reference to a character position in the first character set.

17. The tangible computer-readable medium of claim 13, wherein at least one of the one or more character references is located in a URL in the email message.

18. A non-transitory tangible computer-readable medium having stored thereon program instructions that are computer executable to:
   detect, in an electronic message, one or more character references, wherein each character reference specifies a position of a character within a first character set;
   modify content of the electronic message, including by converting at least one of the one or more character references to a character corresponding to the specified position within the first character set; and
   compare the modified content of the electronic message with a spam message;
   wherein each of the one or more character references is an HTML character reference of the form "&#<num>", wherein <num> is a value that specifies a position of a character within the first character set.

19. The tangible computer-readable medium of claim 18, wherein the program instructions executable to modify the content of the email message include program instructions executable to make at least two passes through the content of the email message to convert character references to characters within the first character set.

20. An apparatus, comprising:
   a processor;
   a memory having stored therein program instructions executable by the processor to:
      detect, in an electronic message, one or more character references, wherein each character reference specifies a position of a character within a first character set;
      modify content of the electronic message, including by converting at least one of the one or more character references to a character corresponding to the specified position within the first character set; and
   compare the modified content of the electronic message with a spam message;
   wherein each of the one or more character references is an HTML character reference of the form "&#<num>", wherein <num> is a value that specifies a position of a character within the first character set.

21. The apparatus of claim 20, wherein the electronic message includes markup data.

22. The apparatus of claim 20, wherein the program instructions executable to modify the content of the email message include program instructions executable to make at least two passes through the content of the email message to convert character references to characters within the first character set.

* * * * *